(12) United States Patent
Czerwinski et al.

(10) Patent No.: US 12,657,329 B2
(45) Date of Patent: *Jun. 16, 2026

(54) METHOD AND SYSTEM OF RESCINDING ACCESS TO BLOCKCHAIN DATA

(71) Applicant: BILLON SP. Z O.O., Warsaw (PL)

(72) Inventors: Remigiusz Czerwinski, Warsaw (PL); Andrzej Horoszczak, Warsaw (PL); Michal Breiter, Warsaw (PL); Marcin Godniak, Warsaw (PL); Jeffrey Deneau, Warsaw (PL)

(73) Assignee: BILLON SP. Z O.O., Warsaw (PL)

( * ) Notice: Subject to any disclaimer, the term of this patent is extended or adjusted under 35 U.S.C. 154(b) by 138 days.

This patent is subject to a terminal disclaimer.

(21) Appl. No.: 18/564,088

(22) PCT Filed: May 27, 2022

(86) PCT No.: PCT/EP2022/064498
§ 371 (c)(1),
(2) Date: Nov. 26, 2023

(87) PCT Pub. No.: WO2022/248724
PCT Pub. Date: Dec. 1, 2022

(65) Prior Publication Data
US 2024/0249015 A1 Jul. 25, 2024

(30) Foreign Application Priority Data

May 27, 2021 (EP) ..................................... 21461545

(51) Int. Cl.
*H04L 29/06* (2006.01)
*G06F 21/60* (2013.01)
(Continued)

(52) U.S. Cl.
CPC ........ *G06F 21/6227* (2013.01); *G06F 21/602* (2013.01); *H04L 9/0891* (2013.01)

(58) Field of Classification Search
CPC .... G06F 21/602; G06F 21/62; G06F 21/6209; G06F 21/6218; G06F 21/6227;
(Continued)

(56) References Cited

U.S. PATENT DOCUMENTS 9,774,578 B1 * 9/2017 Ateniese ............... G06F 3/0673
11,176,093 B2 * 11/2021 Sreedhar ............... H04L 9/0643
(Continued)

OTHER PUBLICATIONS

P. Hillmann, M. Knüpfer, E. Heiland and A. Karcher, "Selective Deletion in a Blockchain," 2020 IEEE 40th International Conference on Distributed Computing Systems (ICDCS), Singapore, Singapore, 2020, pp. 1249-1256, doi: 10.1109/ICDCS47774.2020. 00160. (Year: 2020).*
(Continued)

*Primary Examiner* — Malcolm Cribbs
(74) *Attorney, Agent, or Firm* — Rivka Friedman

(57) ABSTRACT

A method of rescinding access to a designated block within a blockchain, wherein the designated block contains data encrypted with a content encryption key and is associated with metadata, wherein the metadata for the designated block include an obsolescence lock public key. The method includes creating, at the time the designated block is created, an obsolescence lock for supporting a rescission request if the rescission request is agreed upon by a required number of authorized parties for the designated block; splitting the obsolescence lock private key into a number of secret shares; and upon receiving particular rescission instruction block, an agreement instruction block and a confirmation instruction block, removing all encrypted content encryption keys from the metadata of the designated block, thereby rescinding access to the original data within the designated block. An equivalent method is presented to rescind access to a blockchain.

12 Claims, 7 Drawing Sheets

(51) Int. Cl.
    *G06F 21/62*        (2013.01)
    *H04L 9/08*        (2006.01)

(58) Field of Classification Search
    CPC ...... G06F 21/64; G06F 16/1824; G06F 21/44;
               G06F 21/629; G06F 16/2379; G06F
               16/9027; H04L 9/0643; H04L 9/30; H04L
               2209/38; H04L 9/0637; H04L 9/0618;
               H04L 9/3247; H04L 9/3239; H04L
               9/3263; H04L 2209/56; H04L 9/0656;
               H04L 9/0891; G06Q 20/06; G06Q
               20/382; G06Q 20/401; G06Q 2220/00;
               G06Q 20/381; G06Q 40/04; G06Q
               20/3825; G06Q 20/3827; G06K 9/00577;
               G06K 2009/00583
    See application file for complete search history.

(56)             References Cited

U.S. PATENT DOCUMENTS

2019/0147065 A1*  5/2019  Maeda ................. H04L 9/3239
                                              380/37
2019/0155513 A1*  5/2019  Maeda ................. G06F 3/0641

2019/0325038 A1* 10/2019 Finlow-Bates ......... G06F 16/27
2019/0334700 A1  10/2019 Callan et al.
2020/0034553 A1*  1/2020 Kenyon ................ G06F 21/604
2020/0092088 A1   3/2020 Novotny et al.
2021/0006400 A1   1/2021 Hu et al.
2021/0303195 A1*  9/2021 Micali ................. G06F 21/6245
2021/0377001 A1* 12/2021 Schrage ................ H04L 9/3239
2021/0406250 A1* 12/2021 Novo Diaz ......... G06F 16/2379
2022/0012233 A1*  1/2022 Thurau ................... G06F 16/27

OTHER PUBLICATIONS

X. Cai, Y. Ren and X. Zhang, "Privacy-Protected Deletable Blockchain," in IEEE Access, vol. 8, pp. 6060-6070, 2020, doi: 10.1109/ACCESS. 2019.2962816. (Year: 2020).*
Martin Florian et al: "Erasing Data from Blockchain Nodes", arxiv.org, Cornell University Library, 201 Olin Library Cornell University Ithaca, NY, 1453, Apr. 18, 2019, XP081171236.
International Search Report for PCT/EP2022/064498 Mailed on Sep. 16, 2022.

\* cited by examiner

500 — 501 —

| Predecess. Hashsum | Block Hashsum |
| --- | --- |

502 — Metadata

503 — Data

502 —

| 601 — 1st party's encrypted CEK | 1st party's submitted secret — 604 |
| --- | --- |
| 602 — 2nd party's encrypted CEK | 2nd party's submitted secret — 605 |
| ... | |
| 603 — nth party's encrypted CEK | nth party's submitted secret — 606 |

607 — obsolescence lock public key

608 — hashsum

609 — predecessor's hashsum

610 — signature of latest modifier

611 — state for authorized signatures

METHOD AND SYSTEM OF RESCINDING ACCESS TO BLOCKCHAIN DATA

COPYRIGHT NOTICE

FIELD OF THE INVENTION

One or more embodiments of the invention relate to communication systems and information security. More particularly, one or more embodiments of the invention relate to a method to rescind access to blockchain data.

BACKGROUND

Blockchains are used as a ledger (which comes both as public as well as private) in which various types of data are stored in blocks. By design, blockchain-based systems disallow the modification of existing published blocks of data. Any modification made to a block of data will change its hashsum and the hashsums of any subsequent blocks in the chain. This new hashsum will identify the data as having been changed to any examiner, and said block will be rejected during a validation and replication process.

Storage of medical records, durable media, private data, government identification and the like information on blockchain would be well served by a blockchain design which respects the immutability of existing blocks yet provides a secure method to disable access to the content of the block data.

There are already known various methods to disable access to the content of the block data.

It is possible to sign a block with a certificate which expires on a specific date. However, the expiration date is not always known in advance, for example when a judicial court orders the removal of data.

It is also possible to revoke a certificate of the party which signs the block, but this will also revoke the validity of every block signed by that party. Further, revoking the certificate does not prevent the data in the block from being accessed and viewed.

Ergo, while the restriction on modifying data is central to blockchain's ability to provide trust between otherwise untrusting parties, it limits the feasibility of using blockchain-based solutions for applications where data access may later have to be revoked at any time.

BRIEF SUMMARY OF THE INVENTION

There is a need to provide a solution to allow rescinding access to a blockchain or to a block within a blockchain at any time.

The present disclosure provides a description of systems and methods for rescinding access to data published in a blockchain by applying an obsolescence lock. In some embodiments, the system may include an obsolescence lock which may be associated with a block or a blockchain through metadata. The obsolescence lock enables deletion of keys which provide access to either a single designated block or to a plurality of designated blocks within a blockchain. Without the access keys, the encrypted data contained within that designated block is undecipherable. As, by definition, published blockchain data may not be modified, the method implementing an obsolescence lock must add and sign new blocks, providing proof of authorized key deletion.

There is disclosed herein a method of rescinding access to a designated block within a blockchain, wherein the blockchain comprises a plurality of blocks, wherein the designated block contains data encrypted with a content encryption key and is associated with metadata, wherein the metadata for the designated block include an obsolescence lock pubic key, the method comprising the steps of:

a. creating, at the time the designated block is created, an obsolescence lock for supporting a rescission request if the rescission request is agreed upon by a required number of authorized parties for the designated block, wherein the obsolescence lock comprises an obsolescence lock private key and an obsolescence lock public key;

b. splitting the obsolescence lock private key into a number of secret shares;

c. transmitting, to each authorized party for the designated block, an individual secret share of the number of secret shares;

d. receiving, from one of the authorized parties, a rescission instruction block that contains the rescission request related to the designated block;

e. receiving, from another one of the authorized parties, of an agreement instruction block that contains an agreement decision related to the rescission request;

f. removing, upon request from the authorized party that inclusively has comprised the required number of authorized parties that agree upon the rescission request, of all encrypted Content Encryption Keys from the metadata of the designated block, thereby rescinding access to the original data within the designated block; and g. receiving, from the authorized party that inclusively has comprised the required number of authorized parties, of a confirmation instruction block that contains a confirmation of the execution of the rescission, wherein the confirmation instruction block is signed by that agreeing party with the obsolescence lock private key reconstructed by that party.

The method may comprise signing the rescission instruction block with a private key of a requesting party.

The method may comprise adding the obsolescence lock public key to the metadata associated with the designated block.

The method may comprise signing the agreement instruction block with a private key of the authorized party.

The method may comprise submitting the individual secret share of the authorized party from which the obsolescence lock private key may be reconstructed.

The method may comprise signing the confirmation instruction block with the private key of the agreeing party.

In an embodiment, the metadata for the designated block does not form part of data that is used for calculation of a hashsum of the designated block.

There is also disclosed a method of rescinding access to a designated blockchain, wherein the designated blockchain contains data encrypted with a content encryption key and is associated with metadata, wherein the metadata for the designated blockchain include an obsolescence lock public key, the method comprising the steps of:

a. creating, at the time the designated blockchain is created, an obsolescence lock for supporting a rescission request if the rescission request is agreed upon by a required number of authorized parties for the designated blockchain, wherein the obsolescence lock comprises an obsolescence lock private key and an obsolescence lock public key;

b. splitting the obsolescence lock private key into a number of secret shares;

c. transmitting, to each authorized party for the designated blockchain, an individual secret share of the number of secret shares;

d. receiving, from one of the authorized parties, a rescission instruction block that contains the rescission request related to the designated blockchain;

e. receiving, from another one of the authorized parties, an agreement instruction block that contains an agreement decision related to the rescission request;

f. removing, upon request from the authorized party that inclusively has comprised the required number of authorized parties that agree upon the rescission request, of all encrypted content encryption keys from the metadata of the designated blockchain, thereby rescinding access to the original data within the designated blockchain; and g. receiving, from the authorized party that inclusively has comprised the required number of authorized parties, of a confirmation instruction block that contains a confirmation of the execution of the rescission, wherein the confirmation instruction block is signed by that agreeing party with the obsolescence lock private key reconstructed by that party.

There is also disclosed a computer system comprising: at least one nontransitory processor-readable storage medium that stores at least one of processor-executable instructions or data; and at least one processor communicably coupled to the at least one nontransitory processor-readable storage medium, wherein the at least one processor is configured to perform the steps of the method as described herein.

There is also disclosed a computer program product comprising instructions which, when executed on a computer, cause the computer to perform the steps of the method as described herein.

In some embodiments, a method for associating metadata with newly appended blocks includes: generating, by a generation module of a processing computer, metadata which contains the fields and instantiated cryptographic public key data that define an obsolescence lock; and dividing the associated related cryptographic private key into secret shares which may be divided amongst parties authorized to access said block.

In some embodiments, a method for rescinding access to a block or blockchain includes: submission, by a party, of an instruction block requesting submission, by a party, of an instruction block requesting the rescission of a specific block or blockchain; transmission, of the secret share to each owner or authorized party related to the block or blockchain; submission, by an agreeing party, of an instruction block agreeing to the rescission request; reconstruction, by the agreeing party that inclusively has comprised the required number of agreeing parties, of the private key of the obsolescence lock; submission, by the agreeing party that inclusively has comprised the required number of agreeing parties, of an instruction block confirming the rescission request; and removal, by the agreeing party that inclusively has comprised the required number of agreeing parties, of all encrypted CEKs; thereby rescinding access to the original data within the block or blockchain.

In further embodiments, a system for applying an obsolescence lock to blocks or blockchains includes: a data management and communication software module operating on an access device; a data management, verification, replication, storage, and communication software module on a processing server.

In still further embodiments, a system for applying an obsolescence lock to blocks or blockchains includes: a data management and communication module operating on an access device; a data management and communication module of a processing web server; a data management, verification, replication, storage, and communication software module on a processing server.

BRIEF DESCRIPTION OF THE DRAWINGS

Embodiments of the present disclosure are best understood from the following detailed description of exemplary embodiments when read in conjunction with the accompanying drawings. Included in the drawings are the following Figures.

DETAILED DESCRIPTION OF THE INVENTION

Figure 1:
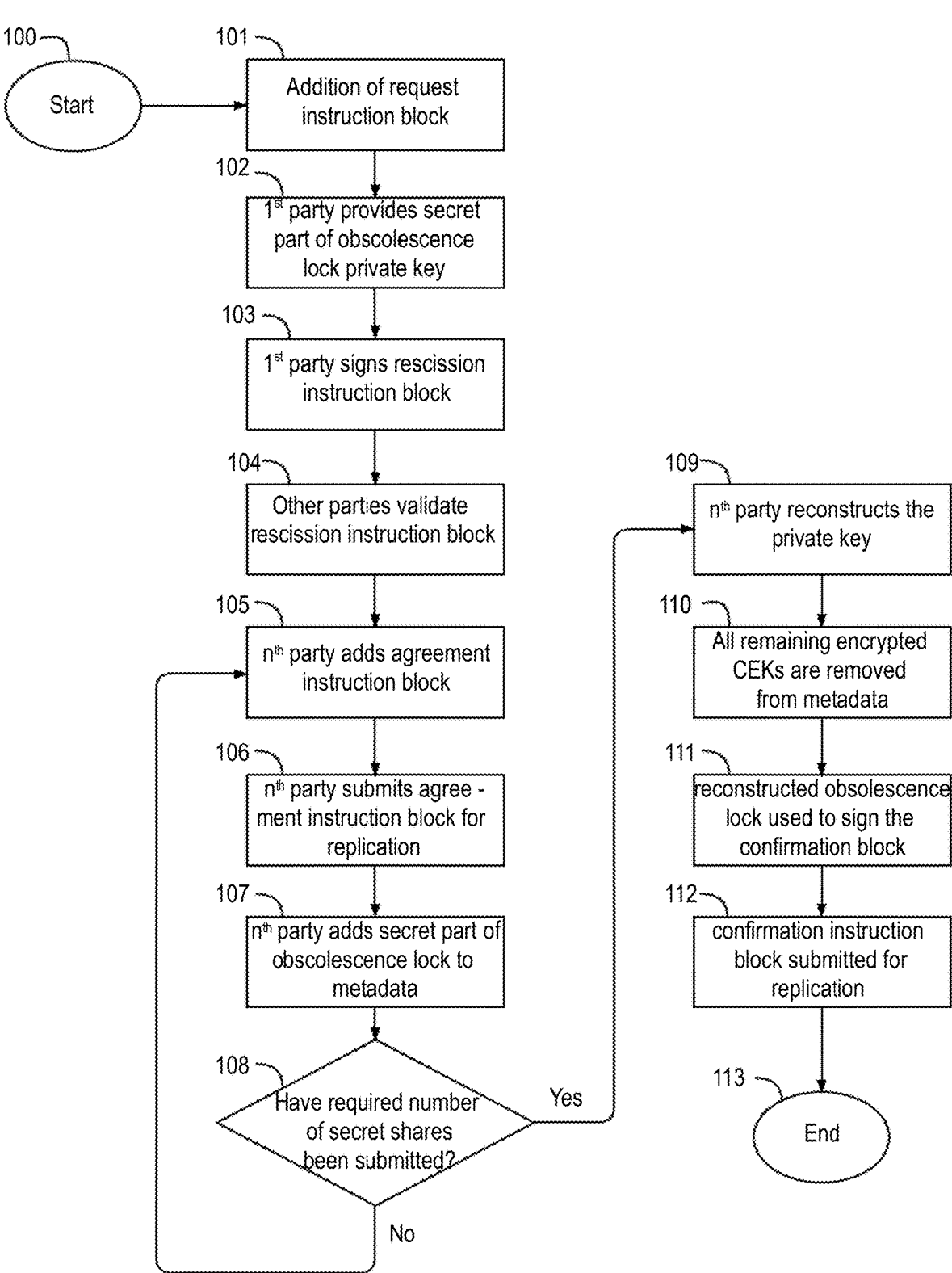
FIG. 1 illustrates an example method by which access to a designated block of data within a blockchain may be rescinded by the application of an obsolescence lock.

Glossary of Terms. The following glossary presents a non-limiting, preferred meaning of some of the terms used throughout the description, but does not exclude their other well accepted definitions as known in the art.

Network. The network enables communication between system components. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The network may use communication protocols including Transmission Control Protocol (TCP) or User Datagram Protocol (UDP), proprietary protocols, the like, or any combination thereof. The preferred embodiment has security features applied to the network, including but not limited to secure or cryptographic protocols such as Trans- port Layer Security (TLS), Secure Sockets Layer (SSL), Hypertext Transfer Protocol (HTTP) Secure (HTTPS), and the like. Further, the preferred embodiment applies addi- tional point-to-point security schemes such as Virtual Pri- vate Networks (VPN) to create secure virtual tunnels to transmit data across security, physical, geographic, or topo- logical barriers.

Web Browser. Representative Web Browsers include, among others, Microsoft Internet Explorer (all versions), Microsoft Edge (all versions), Google Chrome (all ver- sions), Mozilla Firefox (all versions), Apple Safari (all versions), Samsung Internet (all versions) or the like, each of which are downloadable software programs. These software programs are able to connect, retrieve, and display web pages hosted on a Web server and run certain client-side scripting languages that can dynamically logical function- ality.

Web server. The web server hosts formatted image, text, files, objects, and scripting logic, at least some of which that may define websites. Representative web server software includes, among others, Apache HTTP Server (all versions), Apache Tomcat (all versions), Microsoft IIS (all versions), or the like, each of which are downloadable software pro- grams. In the website Internet paradigm, a network path to a server is identified by a so-called Uniform Resource Locator (URL). The World Wide Web (www) is the Inter- net's multimedia information retrieval system. In particular, it is a collection of web servers of the Internet that use the Hypertext Transfer Protocol (HTTP) and derivatives, which provides user access to formatted files using languages such as Hypertext Markup Language (HTML), Cascading Style Sheets (CSS), and the like, as well as client-side scripting languages such as JavaScript and the like. Web servers also can present or manage data through server-side scripting languages such as PHP, Perl, ASP, and the like.

Hash Algorithm/Hash Function. The term "hash algo- rithm" or "hash function" refers to a mathematical algorithm that maps data of an arbitrary size into data of a fixed size. This algorithm is a deterministic one-way function that is infeasible to invert and is collection resistant such that 2 different data inputs do not create the same output hash. The fixed-size output of a hash function is called the "hash", or "checksum", or "hashsum". Cryptographic hash functions are used to provide information security for example, authentication in digital signatures, and as a checksum to detect changes in data caused by transmission errors or modification.

Blockchain. The term "blockchain" or "block chain" refers to a distributed database that is used to maintain a ledger of records called "blocks". One or more computing devices may comprise a blockchain network, which may be configured to process and record data in one or more blocks of one or more blockchains. Each block encapsulates data including, but not limited to, transaction data, document or record data, system instruction data, notification data, com- munications data, timestamp, addresses, participants, pro- cessing logic, and the like. Said data is added to the end of the current "chain" of blocks by creating a new crypto- graphic hashsum combing the hashsum of the previous last block in the chain, and a hash of the new block's encapsu- lated data. Other data and metadata may also be included as inputs to the hashsum. Any changes to the data in a block or a predecessor block will create a corresponding new hashsum. In this manner blockchain systems can determine if any blocks within the chain have been modified. Each block of data in the blockchain has an owner, namely a blockchain identity which the block of data is associated with.

Public Key Cryptography. The term "public key cryptog- raphy", or "asymmetrical cryptography" refers to a crypto- graphic system that uses pairs of keys. The public key of the pair is widely disseminated, while the private key is only known to the owning party. Public key cryptography enables authentication and validation, with the public key used to verify that the owner of the private key signed data. Public key cryptography also enables encryption, where the public key is used as a cypher on data that can only be decrypted using the private key.

The present disclosure is to be considered as an exem- plification of the invention, and is not intended to limit the invention to the specific embodiments illustrated by the Figures or description below.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the inven- tion is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, and components have not been described in detail as not to unnecessarily obscure aspects of the present invention.

DETAILED DESCRIPTION OF EMBODIMENTS

FIG. 1 is a flowchart which illustrates an example method by which access to a designated block of data within a blockchain may be rescinded by the application of an obsolescence lock.

Step 100 represents the start of the workflow to rescind access to a designated block through the use of an obsoles- cence lock. In this example, one or more blocks of data have been written to a blockchain. All parties discussed in this example are assumed to be authorized to read the block to which access is to be rescinded (hereinafter called the "designated block") and may request and agree to rescind keys to the designated block via an obsolescence lock. Optionally, all parties may be allowed to modify the meta- data for the designated block. Further, each authorized party has previously been given a secret share of the private key for the obsolescence lock and its individual encrypted Con- tent Encryption Key (CEK) was added to the metadata for the designated block. In preferred embodiments, an obso- lescence lock may comprise a cryptographically secured set of key data and blockchain blocks which describe the current state of a rescission request, i.e. the request to rescind access to data on one or more blocks in the block- chain. In preferred embodiments, the obsolescence lock may comprise an asymmetric key pair, or parts thereof (as explained with reference to step 108), and "instruction" blocks which may be added to the blockchain. Said instruction blocks may comprise one or more pre-defined instructional enumerations which detail the current status of a request to rescind access to the data in one or more blocks. In preferred embodiments, the instruction block data itself may be unencrypted data. In other exemplary embodiments, the instruction block data may be encrypted if all authorized parties are able to decrypt it through some cryptographic method. In preferred embodiments, key data for an obsolescence lock may be associated with an individual designated block through the designated block's metadata. In such embodiments, the instruction blocks may be added to the same blockchain as the designated block for which access rescission has been requested. In further preferred embodiments, where an obsolescence lock is associated with the entire blockchain, the key data for the obsolescence lock may be associated with the metadata for an instruction block that will be called hereinafter an "rescission instruction block" that has been added to the blockchain, or the metadata for the genesis block of blockchain. The rescission instruction block is one example of the pre-defined enumerations comprising instruction blocks, in this instance it may hold the state of a request to rescind one or more blocks in a blockchain. In such embodiments, all instruction blocks may be added to the same blockchain for which access rescission has been requested. The CEK may comprise a symmetrical key which may be used to encrypt the original data (also called the "plaintext") or, when applied again, potentially with a transformation, decrypt the encrypted data (also called the "ciphertext"). Other exemplary embodiments may use asymmetric key encryption, or other cryptographic methods to encrypt and decrypt the data.

In step 101, the first authorized party wants to rescind all parties' access to the data in a designated block. In preferred embodiments, the first party may add a new instruction block that will be called herein a "request" instruction block to the blockchain. In further preferred embodiments, said block's data may comprise a pre-defined identifier or enumeration that declares this block is an instruction to rescind access to a specific designated block. The address of the designated block may also be specified. In further preferred embodiments, the contents of the request instruction block may be unencrypted. Other exemplary embodiments may encrypt the contained data, which requires communication of the key to all required parties. In further preferred embodiments, the request may be related to an individual designated block in the blockchain. Other exemplary embodiments allow the request to relate to a plurality of designated blocks or to an entire blockchain In step 102, the first party may provide its part of the secret share that comprises the obsolescence lock private key. This part of the secret share may be written into the metadata associated with the designated block for which access rescission has been requested. In preferred embodiments, the metadata for the designated block may be signed by the first party to provide proof of acknowledgment. In other exemplary embodiments, signing the metadata may not occur.

In step 103, the first party may sign this rescission instruction block with its private key, which provides proof of its identity in making the request to rescind. Upon signing, the rescission instruction block and its metadata may be written to the blockchain. In some exemplary embodiments, the requesting party may delete its individual encrypted CEK from the metadata at the same time as it submits the rescission instruction block. This would deny themselves future access to the data, but not affect others who have not yet agreed to the rescission request.

In step 104, the new rescission instruction block and the updated metadata of the designated block targeted for rescission may be sent to other participants (parties) in the blockchain system, requesting rescission. In preferred embodiments, the new rescission instruction block (along with the entire blockchain) preferably must pass a validation process at each participant before the participant allows this rescission instruction block to be added to its copy of the blockchain. The block hashsum of each block in the chain is examined for consistency against the previously published blocks or blockchain. In the event any data or metadata was modified or a hashsum was altered, the replication will fail as the associated block is inconsistent. Assuming all previous blocks are deemed valid, the new rescission instruction block may be examined. The predecessor block hashsum may be validated. The rescission request contained within the block may be recognized by the system. The designated block to have its keys rescinded may be examined, and the party that created the new rescission instruction block may be confirmed as authorized to make the request. With the rescission instruction block verified, replication of this rescission request may be authorized, and all data and metadata are accepted by other nodes in the network.

Step 105 requires another authorized party to agree to the initial request. When another party (henceforth called the second authorized party, or the n-th authorized party in the general case) who is authorized to rescind access to the designated block or blockchain receives and replicates the rescission instruction block, it may perform additional actions. The second authorized party may either approve or ignore the rescission request in either a manual or automated process. Examples of manual processes may involve notifying authorized people through email, messenger, SMS, and the like. Automated processes may be based upon rule criteria and the data, for example, automatically approve rescission requests on blocks created prior to 2 years before.

In the event the second authorized party ignores or does not approve the rescission request, then nothing happens after replicating the rescission request. No data has been deleted and the instructional aspects of the new rescission instruction block will be ignored.

Step 105 occurs when the second authorized party (or the n-th authorized party in the general case) approves the rescission request, it may add a new instruction block to the blockchain after the rescission request. This new block will be called hereinafter an "agreement" instruction block. In preferred embodiments, the agreement instruction block's data comprises a pre-defined enumeration that declares this block is a special instruction that agrees to the rescission request to rescind keys for the designated block. The address of the designated block may be also specified. In preferred embodiments, the contents of the agreement instruction block may be unencrypted. Other exemplary embodiments may encrypt the contained data, which requires communication of the decryption key to all required parties.

The private key of the second authorized party may be used to sign the agreement instruction block that agrees to the rescission request, which provides proof of its identity. In some exemplary embodiments, each agreeing party may delete that party's individual encrypted CEK from the metadata at the same time as that party submits the agreement instruction block. This would deny themselves future access to the data, but not affect others who have not yet agreed to the rescission request.

In step 106, the second party (or n-th party in the general case) may submit the agreement instruction block to other network participants for verification, validation, and replication.

In step 107, the second party (or n-th party in the general case) may add its part of the secret share for the obsolescence lock private key to the metadata of the block targeted for rescission. In preferred embodiments, the second party may sign the metadata with its private key to confirm its identity is behind the update.

Step 108 is a conditional step, the path chosen dependent upon the number of secret shares submitted by authorized parties for the obsolescence lock. The second party may check if there exist sufficient secret shares written to the metadata of the designated block to reconstruct the obsolescence lock private key. In preferred embodiments, the secret share may comprise only 2 parts, so the second party is able to reconstruct the obsolescence lock private key. The second party may now use its part of the secret share that comprises the obsolescence lock private key. In other exemplary embodiments, the number of required secret shares t may be larger than 2. In these embodiments, in the event that there are not sufficient secret shares, the workflow returns to step 105, waiting for additional authorized parties to agree to the request. In the event there is a sufficient number of secret shares received with the inclusion of the current party's agreement, the workflow proceeds to step 109.

In step 109, the second party (or n-th party in the general case) reconstructs the obsolescence lock private key using its own secret share and all those previous secrets submitted to the metadata by the other authorized parties who have already agreed. In some exemplary embodiments, reconstructing the obsolescence lock private key from the secret shares may require a particular sequence. In such embodiments, the sequence information may also be stored to and read from the metadata.

Steps 109-112 may vary in the number of times parties create confirmation instruction blocks. Also, in preferred embodiments, the obsolescence lock mechanism may be configured according to the allowance of one or more parties writing to the blockchain after a rescission instruction block has been sent, but before confirmation instruction block has been written. This configuration determines the protocol used to prevent any loss of data in simultaneous block additions or modifications. The determination of the protocol to use depends upon the specific use of the blockchain, in part whether additional blocks contain alterations to the previous blocks of data, or are independent versions.
3-Step Process:

In preferred embodiments, a shorter process may be used when the deployment does not need to prevent simultaneous writes to the blockchain during the obsolescence process. The following describes this shorter three step process starting after the second authorized party signs the agreement block with its key:

In step 110, the reconstructed obsolescence lock private key may be used to validate the destruction of the encrypted CEKs. The second authorized party (or n-th party in the general case) removes the CEKs for both the first and second parties from the metadata. Without the CEKs there is no way to decrypt the original data. The metadata for block with keys marked for deletion may be signed by the second party (or n-th party in the general case), proving it has altered the data. A new instruction block may be added to the blockchain after the agreement block—this new block will be called hereinafter a "confirmation" instruction block. In preferred embodiments, said block's data may comprise a pre-defined enumeration that declares this block is a special instruction that agrees to a rescission request to rescind the designated block. The address of the designated block may be also specified. In preferred embodiments, the contents of the confirmation instruction block are not encrypted. Other exemplary embodiments may encrypt the contained data, which requires communication of the decryption key to all required parties.

In step 111, The confirmation instruction block may be signed with the reconstructed obsolescence lock private key. This proves that the key was properly reconstructed, which in turn required sufficient shared secrets to have been collected. In preferred embodiments, the second authorized party (or t-th party in the general case) may purge the reconstructed obsolescence lock private key from main and secondary memory.

In step 112, the confirmation instruction block and the updated metadata of the designated block are ready, and these additions and updates are then submitted for replication. Each party that receives the agreement instruction block and the confirmation instruction block and a request to replicate these blocks must verify and validate said changes. The party that receives the update verifies the signature on the confirmation instruction block to check whether it was signed by the second authorized party (or t-th party in the multiple party case and that a sufficient number of confirmation instruction blocks now exist to invoke the obsolescence lock). In preferred embodiments, the metadata associated with the block with keys to be deleted may be examined for the removal of all copies of the encrypted CEKs from the metadata and the removal of all shared secrets related to the obsolescence lock private key confirmed. Said metadata may also be confirmed to be signed with the valid signature of the obsolescence lock. In preferred embodiments, the general state of the blockchain may also be examined, confirming that the rescission instruction, agreement decision, and confirmation of keys destruction have all been executed in the proper order and are correctly merged with any other newly added blocks to the chain. Upon verifying and validating the additions and changes to the blockchain, the changes are accepted locally and replication continues by passing on the update to adjacent nodes in the blockchain network.

The encrypted CEKs are no longer available to neither the first nor the second party (or in other exemplary embodiments any party where there are more than 2 parties). No participant possesses the means to decrypt and access any underlying data in the designated block that has been subject to the rescission.
n-Step Confirmation:

In preferred embodiments, a longer process may be used when the deployment seeks to prevent conflicting simultaneous writes to the blockchain during the obsolescence process. The following describes this longer n-step process starting after the second authorized party signs the agreement block with its key (where n is the number of parties who have encrypted CEKs contained in the metadata of the block marked for key deletion):

Returning to step 110 in the n-Step confirmation case, the reconstructed obsolescence lock private key may be used to validate the destruction of the keys. The second authorized party (or t-th party in the general case) deletes the CEK for only the second party from the metadata. Without the CEK there is no way for the second party to decrypt the original data. The metadata for block with keys to be deleted may be signed by the second party (or t-th party in the general case), proving it has altered the data. A new instruction block is added to the blockchain after the agreement instruction block. This new block may be the confirmation instruction block declared by the second authorized party (or t-th party). In preferred embodiments, the data of the confirmation instruction block may comprise a pre-defined enumeration that declares this block is a special agreement instruction that agrees to a rescission request to rescind the keys of a specific block. The address of the agreed-upon block to be rescinded may also be specified. In preferred embodiments, the contents of the confirmation instruction block are not encrypted. Other exemplary embodiments may encrypt the contained data, which requires communication of the key to all required parties.

In step 111 of the n-Step confirmation case, said confirmation instruction block may be signed with the reconstructed obsolescence lock private key. This proves that the key was properly reconstructed, which in turn required sufficient shared secrets to have been collected. Further, the n-th authorized party must sign the confirmation instruction block with its own private key, to confirm it is that party who used the lock.

The n-th authorized party may now write the reconstructed obsolescence key that comprises the obsolescence lock private key into the metadata for the block marked for key deletion. In some exemplary embodiments, the second party may also sign the metadata with its private key to prove its identity as modifier.

In step 112 of the n-Step confirmation case, the confirmation instruction block and the updated metadata with the deleted key and reconstructed private key for the obsolescence lock are submitted to the blockchain network for replication.

Each party that receives the agreement instruction block and confirmation instruction block and request to replicate must verify and validate said changes. The party that receives the update verifies whether the signature on the confirmation instruction block was created by the second authorized party (or t-th party in the multiple party case and that a sufficient number of agree blocks now exist to invoke the obsolescence lock). In preferred embodiments, the metadata associated with the block with keys marked for deletion may be examined with the removal of all copies of the encrypted CEK from the metadata and the removal of all partial shared secrets related to the obsolescence lock private key confirmed. Said metadata may also be confirmed to be signed with the valid signature of the obsolescence lock. In preferred embodiments, the general state of the blockchain may also be examined, confirming that the rescission request, agreement decision, and confirmation of key destruction have all been executed in the proper order and are correctly merged with any other newly added blocks to the chain. Upon verifying and validating the additions and changes to the blockchain the changes are accepted locally and replication continues by passing on the update to adjacent nodes in the blockchain network.

The first authorized party (and the other authorized parties who have an encrypted key in the metadata for the block marked for deletion) will receive, verify, and validate the updated blockchain data. Each party may then add a new "confirm" block signed by both the obsolescence lock's private key and its own private key. Further, each party may delete its encrypted CEK from the metadata of the block marked for deletion, then in some embodiments sign the updated metadata with its private key. In preferred embodiments, the t-th party (where t is the minimum required number of parties required to obtain the obsolescence lock) to delete its encrypted CEK from the metadata may also delete all remaining encrypted CEK keys as well as the private key for the obsolescence lock from the metadata. In other exemplary embodiments, this last step does not have to be performed, as its individual signatures are sufficient proof of identity. After each party writes its new "confirm" block, the party submits the updated blockchain and metadata to the network for replication.

Once enough required parties have agreed to and confirmed the deletion of their encrypted CEK to the designated block to which access is to be rescinded, any remaining encrypted CEK keys may be removed. After the removal of all encrypted CEK keys is complete, no party has access to the encrypted data of the block.

In preferred embodiments, similar methods may be used to rescind an entire chain of blocks in a blockchain. First, the previously described method may be applied sequentially to each block in the blockchain in any sequence to rescind the entire chain.

Other exemplary embodiments may instead introduce the concept of an "rescission instruction block" for the entire blockchain. This exemplary embodiment differs from preferred embodiments in that the genesis block now has associated metadata as well, and that metadata contains the encrypted CEK for each party that is associated with every block in the chain. Also, the metadata associated with the genesis block contains the public key portion of the obsolescence lock. When the genesis block is created the private key for the obsolescence lock is divided into secret shares and distributed to every owner or otherwise authorized party.

To rescind all keys in the chain, the first party must add a new block to the chain which maintains the state of a rescission request associated with the chain, this is an "rescission instruction block". Initially, said rescission instruction block may comprise an instruction in the block data requesting the rescission of access to one or more blocks in the chain. The rescission instruction block is signed by the requesting party and is analogous to the "rescission request" block from the earlier embodiment (except this time the rescission instruction block applies to the entire chain). The first party then updates the metadata of the genesis block to add its secret part of the private key for the obsolescence lock. In some exemplary embodiments, the genesis block may be signed, or otherwise secured by ensuring the first party is authorized. The updated blockchain is sent to other parties for verification, validation, and replication.

In embodiments where a shorter 3-step confirmation process is sufficient, the second party (through t-th party) may agree to the request to rescind keys by adding its agreement instruction block to the blockchain and signing said block. Then this party creates a "confirm" block, and removes its encrypted CEK from the metadata of the genesis block. This party then purges from main and secondary memory the encrypted CEK, and the obsolescence lock private key.

In embodiments where a longer n-step confirmation process is required, each t-th party which is the required number (or n-th party when all parties must agree) may create an "agree" block signed with its private key. Each party may also be required to create a "confirm" block signed with its private key. Each authorized party may be required to add its part of the secret share for the obsolescence lock private key to the metadata of the genesis block. Also, each party may be required to remove its encrypted CEK from the metadata for the genesis block. The updated blockchain may then be submitted for verification, validation, and replication.

If, during this process a sufficient number of parties have submitted their secret parts of the private key for the obsolescence lock, the current party may reconstruct said private key. All remaining encrypted CEK entries in the metadata of the genesis block may now be deleted, and optionally all the secret private key parts submitted. The obsolescence lock private key may then be used to sign the rescission instruction block, confirming the completion of the instruction.

After step 112 the workflow proceeds to step 113 where it may end. All encrypted CEKs have been destroyed.

In further embodiments, a method of rescinding access to a blockchain or a designated block within the blockchain, wherein the blockchain comprises a plurality of blocks, may comprise the steps of: creating, at the time the designated block is created, an obsolescence lock for supporting a rescission request if the rescission request is agreed upon by a required number of parties; splitting the obsolescence lock private key into a number of secret shares; submission, by a party, of an instruction block requesting the rescission of a specific block or blockchain; transmission, of the secret share to each owner or authorized party related to the block or blockchain; submission, by an agreeing party, of an instruction block agreeing to the rescission request; reconstruction, by the agreeing party that inclusively has comprised the required number of agreeing parties, of the obsolescence lock private key; submission, by the agreeing party that inclusively has comprised the required number of agreeing parties, of an instruction block confirming the rescission request; and removal, by the agreeing party that inclusively has comprised the required number of agreeing parties, of all encrypted CEKs; thereby rescinding access to the original data within the block or blockchain.

In still further embodiments the method may further comprise signing the rescission instruction block with the private key of the requesting party.

In still further embodiments the method may further comprise adding the obsolescence lock public key to the metadata associated with the block or blockchain.

In still further embodiments the method may further comprise signing the agreement instruction block with the private key of the agreeing party.

In still further embodiments the method may further comprise submitting the party's portion of the secret share from which the obsolescence lock private key may be reconstructed.

In still further embodiments the method may further comprise signing the confirmation instruction block with the private key of the agreeing party.

In still further embodiments the method may further comprise submitting the party's portion of the secret share into the metadata associated with a block or blockchain.

In still further embodiments the method may further comprise removing the encrypted CEKs from the metadata associated with the block or blockchain.

Figure 2:
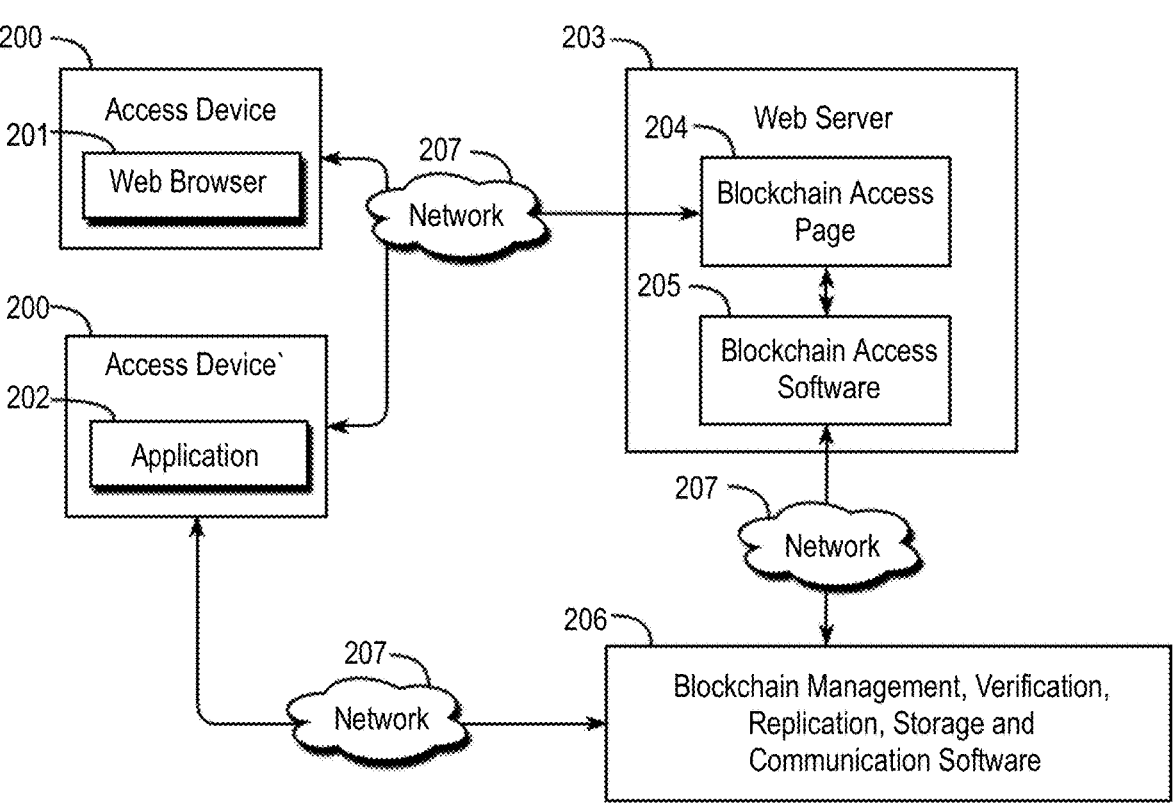
FIG. 2 illustrates an exemplary system used by a party to access and manage data on a blockchain that may be used in a method as presented herein.

FIG. 2 illustrates an exemplary system used by a party to access and manage data on a blockchain that may be used in a method as presented herein. Further, this exemplary system enables said party to add an obsolescence lock to a block, or in some embodiments to multiple blocks or to an entire blockchain.

Element 200 is an access device the party uses to manage the blockchain and metadata, including, but not limited to, adding data blocks, adding instruction blocks, creating and updating metadata, managing keys, rescission requests and agreements, and confirming. By way of example only, the access device 200 may be a computer, a tablet, a mobile phone, or another processing-capable device. In preferred embodiments, the access device 200 hosts a web browser 201 or an application 202, either of which may connect via a network 207 to either a web server 203 or to a blockchain management, verification, replication, storage, and communication software 206. For illustrative purposes, the network 207 may be the Internet, an Intranet or other known connection. In the case of the Internet, the web server 203 may be a singular server or plurality of physical or virtual servers which are accessible to one or more employer devices, one individual example of which is illustrated by the access device 200.

The web server 203 functions as a hosting point for blockchain management operations, including services related to the obsolescence lock. The web server 203 hosts a blockchain access page 204, a web page which acts as a user interface for the party. In preferred embodiments, the web server 203 may also host a blockchain access software 205, i.e. a software client that communicates and manages blockchain data over the network 207 with the blockchain management, verification, replication, storage and communication software 206. In other exemplary embodiments, the blockchain access software 205 may be a process hosted on a different server from the web server with communication over the network 207, or be entirely incorporated within the blockchain management, verification, replication, storage, and communication software 206.

The web server 203 offers user-level blockchain management operations for parties through the blockchain access page 204. These operations include, but are not limited to, creating new blockchains, adding blocks to existing blockchains, reading data contained within blocks, reading transaction histories, performing transactions, requesting obsolescence locks, and agreeing to obsolescence locks. Other operations offered on the blockchain access page 204 may depend on a particular embodiment and related use cases, for example a blockchain that supports a payment system may offer operations such as the ability to transfer funds, convert funds into other formats, and viewing payment histories. Durable media products built on a blockchain may offer document publishing and retrieval from the blockchain access page 204.

The web browser 201 displays the blockchain access page 204 to the party. The blockchain access page 204 enables the party to manage blocks and blockchain data and implement obsolescence locks on said blocks. The blockchain access page 204 may be implemented as a single HTML or CSS web page or via multiple web pages that constitute a management function. In preferred embodiments, the blocks, blockchains, and obsolescence locks managed from the blockchain access page 204 enable the party to rescind access to the data contained within a block. Other exemplary embodiments may enable the party to rescind access to multiple blocks or an entire blockchain from the blockchain access page 204. The management tools presented on the blockchain access page 204 define a User Interface (UI) for the party.

In preferred embodiments, the blockchain access page 204 communicates party requests to the blockchain access software 205. In preferred embodiments, the blockchain access software 205 may be a separate process that exists on the web server 203 or on a different server in the same secured network 207. In preferred embodiments, the blockchain access software 205 performs most business and software logic, calculations, and state data is saved or occurring on the web server 203 or a different virtual or physical server, with the remaining work performed by the blockchain management, verification, replication, storage, and communication software 206 on other access devices 200, and web servers 203. In some exemplary embodiments, the blockchain management, verification, replication, storage, and communication software 206 may be hosted on one or more dedicated server "nodes", or in a processing "cloud" service. In such embodiments, the amount of work performed in the blockchain access software 205 may be reduced.

The access device 200 can optionally use an installed software application 202 (depending on device context optionally called a "program", an "application", or an "app") to access the blockchain access page 204. The Application 202 may be available through mobile application "stores" such as Google Play and the Apple Store, or direct download URLs. The application 202 may itself host the blockchain access page 204 in an embedded web browser, or display the provided data in another UI format. Further, the application 202 can offer more direct integration with the blockchain management, verification, replication, storage, and communication software 206. In preferred embodiments, said direct integration functionality has most business and software logic, calculations, and state data may be saved or occurring on the access device 200, with the remaining work performed by the blockchain management, verification, replication, storage, and communication software 206 on separate access devices 200, and web servers 203. In some exemplary embodiments, the blockchain management, verification, replication, storage, and communication software 206 may be hosted on one or more dedicated server "nodes", or in a processing "cloud" service. In such embodiments, the amount of work performed in the application 202 may be reduced.

The application 202 and the blockchain access software 205 may communicate over the network 207 with the blockchain management, verification, replication, storage, and communication software 206. As mentioned, the amount of processing done by blockchain management, verification, replication, storage, and communication software 206 will vary depending on the embodiment design and available processing power on each access device 200 and the web server 203. In preferred embodiments, the data management, processing, and calculations are performed predominantly on either the access device 200 or the web server 203. In preferred embodiments, this enables a distributed data processing network for managing, sharing, and sharing the blockchain data. Other exemplary embodiments may the majority or all data processing performed by the blockchain management, verification, replication, storage, and communication software 206 to a dedicated distributed or centralized system of one or more physical or virtual servers, a cloud, or similar system.

The blockchain management, verification, replication, storage, and communication software 206 may store data in various locations, including, but not limited to, in memory, either volatile or non-volatile, on disc volumes such as Hard Disk Drives (HDD), solid state storage, or removable media such as Secure Digital (SD) memory cards, clouds, remote drives, and other forms of direct or indirect storage. The blockchain management, verification, replication, storage, and communication software 206 may store formatted data such as in a relational or object-oriented Database system, exemplified by software such as Oracle Database, Microsoft SQL Server, MySQL and the like. Further blockchain management, verification, replication, storage, and communication software system 206 may store data in a distributed format that spans multiple memory and disc volumes or in any combination of the above. In preferred embodiments, the preference is to store blockchain and obsolescence lock related data in local memory, or on the local disk of the access device 200 or the web server 203. In other exemplary embodiments, said data may be predominantly stored on distributed, redundant devices such as on one or more servers or in a cloud.

Figure 3:
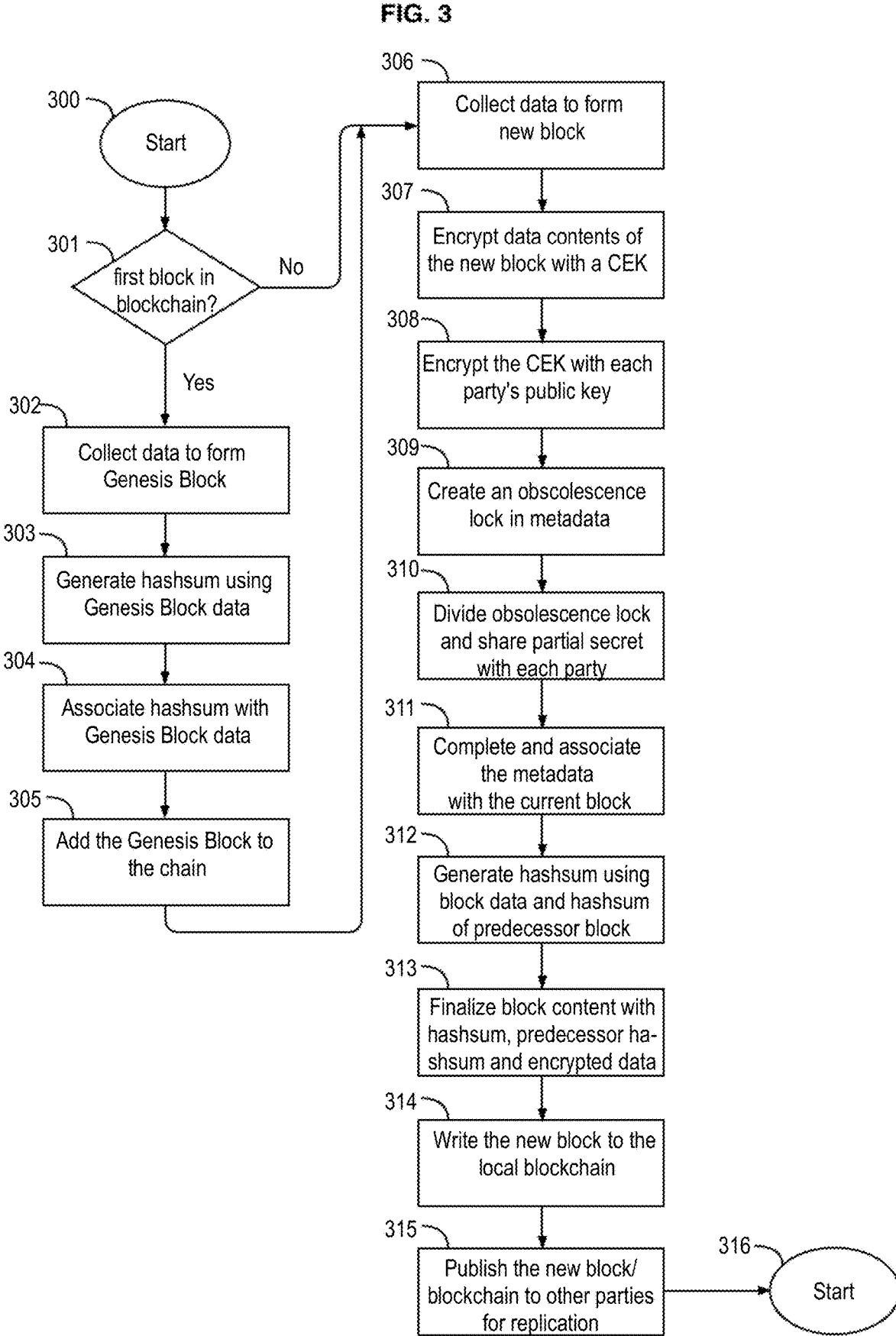
FIG. 3 illustrates an example method by which a new block may be added to the blockchain in a way that supports an obsolescence lock mechanism.

FIG. 3 illustrates an example method by which a new block may be added to the blockchain in a way that supports an obsolescence lock mechanism.

The method starts at step 300, and proceeds to step 301.

Step 301 is a conditional step that directs the workflow based upon whether this block to be added is the first in the blockchain. In the event it is the first data block in this blockchain the genesis block may be added first, and the workflow proceeds to step 302.

In step 302, in preferred embodiments, the data is collected which will form the genesis block. The genesis block is defined as the first block of a block chain. In preferred embodiments, the data in the genesis block details the approximate time the block was created and provides initial data that contributes to the hash sum that will be used by all subsequent blocks in the chain. In preferred embodiments, the approximate time of creation may be retrieved from an external source that does not need to be controlled by the system described herein, for example from a trusted authority which can verify the time as stated is correct. For example, a timestamp signed with the Qualified Signature of a certificate authority. Other exemplary embodiments may use as data a URL that references a pre-defined certificate (which itself has a creation time signed by a trusted certificate authority). Other exemplary embodiments may use a timestamp signed by a Hardware Security Module (HSM) for the data in the genesis block. Another exemplary embodiment may ask one or more nodes in the blockchain network for a time, signed by each participant's private key. Further exemplary embodiments may reference the hash sum of a publicly-known blockchain block such as Ethereum or BitCoin. Yet another example embodiment may have the block data comprised of the text, or reference to, of a well-known published work, such as a newspaper or magazine article, that, having been made public, may have the contents verified. The data stored in the genesis block may be a reference or non-reference data. In the various embodiments, data stored in the genesis block may be either encrypted or unencrypted.

In step 303, a hashsum may be calculated using a hash function with the data in the genesis block as input. In preferred embodiments, the data forming the genesis block may be provided as the input to a hash function. This function may create a fixed-size output hash, or a hashsum. The same hash function algorithm must be used to validate the data. In preferred embodiments, the hash function may be collision-resistant so there is a low probability that the generated hash would match a different set of data. In preferred embodiments, a cryptographic hash function is used. Example hash functions include, but are not limited to, SHA-0, SHA-1, SHA-2, SHA-3, SHA-256 and derivatives, BLAKE, BLAKE2, and the like. Other exemplary embodiments may use provably secure hash functions. Yet other exemplary embodiments may instead use less collision-resistant functions.

In step 304, the calculated hashsum may be associated with the data in the genesis block. In preferred embodiments, this is done in the software by instantiating a data structure that contains both elements. This hashsum will be referred to as the "block hashsum".

In step 305, the data structure representing the genesis block and associated hashsums may be added to the blockchain. In some exemplary embodiments, there may be metadata also associated with the genesis block to be used for identifying any obsolescence locks that may be applied to one or more block or the entire chain. After adding the genesis block to the chain the workflow proceeds to step 306.

Returning to step 301, in the event the first block is already a genesis block and other blocks are already in the current chain, the workflow proceeds to step 306.

In step 306, data is collected to be stored in a new data block. Said data may be provided to the party that is adding the block or it may have to be gathered by said party directly. The data stored in the new block may be reference, or non-reference data. The data stored in the block may itself be encrypted or unencrypted.

In step 307, in preferred embodiments, the data in a new block may be encrypted with a symmetrical cryptographic key. Examples of symmetrical keys algorithms include block ciphers and stream ciphers and include, but are not limited to, AES, DES, Camellia, RC6, RC4, ChaCha, Salsa20, HC-256, Grain, Trivium and the like. The symmetric key applied to the data will be referred to as the Content Encryption Key (CEK). In preferred embodiments, the result of the data that is encrypted with the CEK may be stored in the data portion of the block 503, FIG. 5. In other exemplary embodiments, this data could be stored elsewhere and a reference to the encrypted data is instead stored in the block. In preferred embodiments, the system purges itself of the original collected data used to define the block. This includes main system memory 806, FIG. 8 and all forms of secondary memory 807, FIG. 8. Only the encrypted version of the data may remain to enhance system security.

In step 308, using public key cryptography or asymmetric cryptography, the CEK may be encrypted with the public key of the first party. Only the first party may thereafter access this copy of the CEK using its private key, as only the first party knows its private key. Example public key cryptography techniques include, but are not limited to, RSA, DSS, elliptic curves, Paillier cryptosystem and the like. Then the CEK can be encrypted using the respective public key for each relevant party (either an owner of the block or otherwise authorized party with read or modify rights). Each authorized party will be the only entity capable of decrypting its encrypted CEK (as only that party knows its private key).

In step 309 the "obsolescence lock" may be created. In preferred embodiments, the data associated with the obsolescence lock is partially stored in metadata that is associated with the block being added to the chain. Metadata is defined as additional information including, but not limited to, information about the block's data content (also called payload), about the state of a block, time related to the block's publication or modification, external references, keys, the obsolescence lock, internal data structures with their own information, ownership, authorization, validity, conditional operators, and governing rules. Other exemplary embodiments may see some of the data associated with the obsolescence lock stored in the data of a data block, in metadata that is associated with an entire chain, or in specially recognized instruction blocks that apply to one or more blocks or an entire chain.

Figure 5:
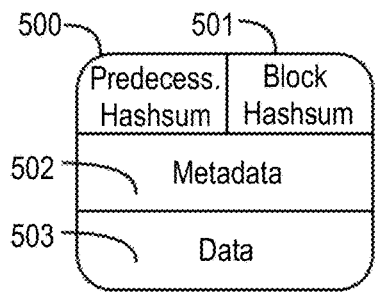
FIG. 5 is an example data structure representing a block in an illustrative blockchain. This exemplary data structure supports the application of an obsolescence lock to rescind access to the contained data according to various embodiments described herein.

In preferred embodiments, the metadata 502, FIG. 5 may be contained in the same data structure as the block, but is not part of the hashsum calculation. In preferred embodiments, changes to the metadata may be signed by the modifying party with its private key. When the changed metadata is later replicated, each receiving party validates the changes to leave the metadata in a valid state, the modified metadata is signed, and the modifying party is authorized to make said changes.

In preferred embodiments, modifications to the metadata may only be performed by verified data owners or otherwise properly authorized parties. In preferred embodiments, the identities of owners and authorized parties may be stored in the metadata itself. In other exemplary embodiments, owners and authorized parties may be identified in the data of a block, or via additional fields added to the data structure that defines a data block, and may be part of the hashsum calculation or not. In preferred embodiments, modifications to the metadata may only be allowed after validation of both the state of the metadata after the operation and validation of any instructions and data passed to perform the modification. In preferred embodiments, the metadata structure may be defined in terms of associated information as well as rules which define the consistency of the data and the acceptable states of said data either singly or in aggregate. Said rules may be defined in various ways including, but not limited to, operators, a language syntax—either compiled or interpreted, and may be predefined or customizable. Other exemplary embodiments may eschew the signing of the metadata by the modifying party to validate changes made by that party, either providing no security mechanism, or coordinating security and validation with a trusted system.

In other exemplary embodiments, the metadata may be in a separate data structure that may be referenced by the current block and may maintain a reference to the current block address. In this event the metadata is also provided as input to the hashsum calculation. Other exemplary embodiments may only reference the current block from the metadata, or only reference the current block reference the metadata. In preferred embodiments, the metadata may be signed with the private key of the last party who modified it. Other exemplary embodiments may eschew signing the metadata by an authorized party, with commensurate lack of tracking and accountability. The metadata may not be used in the calculation of a block hashsum. Metadata may be replicated in conjunction with the associated block, subject to authorization checks and the validation of the block and metadata.

In step 309, preferred embodiments instantiate metadata that may be associated with the current block. A cryptography primitive that supports the "obsolescence lock" may be instantiated. In preferred embodiments, the obsolescence lock may be implemented with a public key cryptography primitive. A public/private key pair may be created to comprise the obsolescence lock, and the public key from this pair may be written into the metadata. This public key may be used to validate any signings made by the obsolescence lock.

In step 310, the obsolescence lock private key may be divided into n unique parts, where n is the number of parties authorized to add to the current blockchain or modify the current block. In preferred embodiments, n is 2, representing the first and second parties. In other exemplary embodiments, any number n of authorized parties may be used. Examples of n greater than 2 include, but are not limited to, multi-party transactions, transactions involving multiple partial owners or authors of a block of data, data which may involve regulators, observers, or arbiters, and the like. In preferred embodiments, the division of the private key into multiple parts may be accomplished by a secret sharing or a secret splitting scheme. The principal characteristic of the secret sharing scheme may be the original secret (the private key) that may only be reconstructed when a sufficient number of the divided shares of the secret are recombined together. In preferred embodiments, all n secret shares must be recombined in order to recreate the original private key. In other exemplary embodiments, a threshold t, where t is less than n may be sufficient to recombine the private key. Examples of secret sharing methods include, but are not limited to cryptography techniques such as Shamir's Secret Sharing, Blakley's Secret Sharing, the Chinese Remainder Theorem, and the like.

One part of the divided private key should be given to each party who is authorized to modify or rescind this block. In preferred embodiments, each authorized party stores its portion of the private key on the receiving party's access device 200, FIG. 2 and keep it secret. In exemplary embodiments where the secret sharing scheme requires the ordering of secret shares, the position of this secret share must also be communicated to the authorized party. The secret share given to the authorized party should be purged from the main and secondary memory of all involved systems (excluding the receiving party's access device 200, FIG. 2). In preferred embodiments, the secret shares are not initially written to the metadata for the obsolescence lock, only being added later when a party agrees to the application of an obsolescence lock. In preferred embodiments, the private key is also not written into the metadata and may instead be purged from main system memory and secondary memory after having been distributed to the parties.

In step 311, the metadata may be finalized. Each party's encrypted CEK may be added to the metadata. In preferred embodiments, the system purges itself of the original CEK used to encrypt the data. This includes purging the encrypted CEK from main system memory 806, FIG. 8 and all forms of secondary memory 807, FIG. 8. Only the n encrypted versions of the CEK associated with each authorized party will remain in the metadata; decryptable only by their respective owners.

Figure 7:
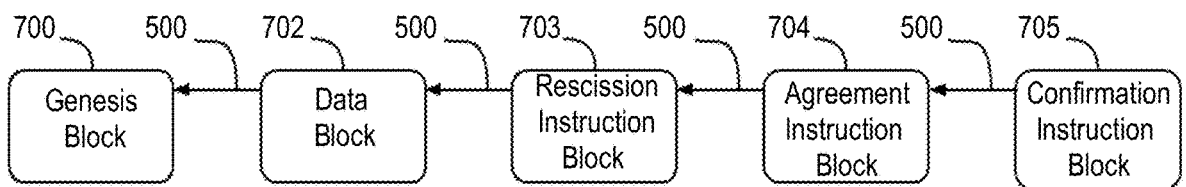
FIG. 7 is a high-level example of an instance of the preferred embodiment blockchain with an obsolescence lock applied according to various embodiments described herein.

In step 312, a hash function may be applied to the data in the current block and the block hashsum 501, FIG. 5 from the immediate predecessor block (initially the genesis block, 700, FIG. 7). In preferred embodiments, the inputs to the hash function may be the collected data that forms the current block, and the hashsum from the immediate predecessor block. The hash function may create a fixed-size output hash, or hashsum. In preferred embodiments, the hash function may be collision-resistant so there is a low probability that the generated hash would match a different set of data. In preferred embodiments, a cryptographic hash function may be used. Example hash functions include, but are not limited to, SHA-0, SHA-1, SHA-2, SHA-3, SHA-256 and derivatives, BLAKE, BLAKE2, and the like. Other exemplary embodiments may use provably secure hash functions. Yet other exemplary embodiments may instead use less collision-resistant functions.

In step 313, the calculated hashsum may be associated with the block. In preferred embodiments, this may be done in the software by assigning both the block data and the calculated hashsum as elements of a data structure. Said hashsum becomes the block hashsum 501, FIG. 5. Then the block hashsum from the immediate predecessor block is associated with the current block.

In preferred embodiments, this association may be done by adding the predecessor's block hashsum to the block's representative data structure. Said hashsum becomes the current block's predecessor block hashsum 500, FIG. 5. The block's encrypted data may also be associated with the block. The metadata may also be associated with the block. In preferred embodiments, the metadata with the public key of the party that is adding this block to the blockchain may be signed. Other exemplary embodiments may eschew signing the metadata, with a concurrent loss of accountability and tracking changes.

In step 314, the block including metadata may be added to the blockchain. If a newer version of this blockchain is received from other nodes the changes are validated and merged.

In step 315, the blockchain, including the new block and metadata and any subsequently merged changes, may be published to other parties for replication.

Step 316 represents the end of the workflow for adding a new block to the blockchain which includes an obsolescence lock mechanism.

Figure 4:
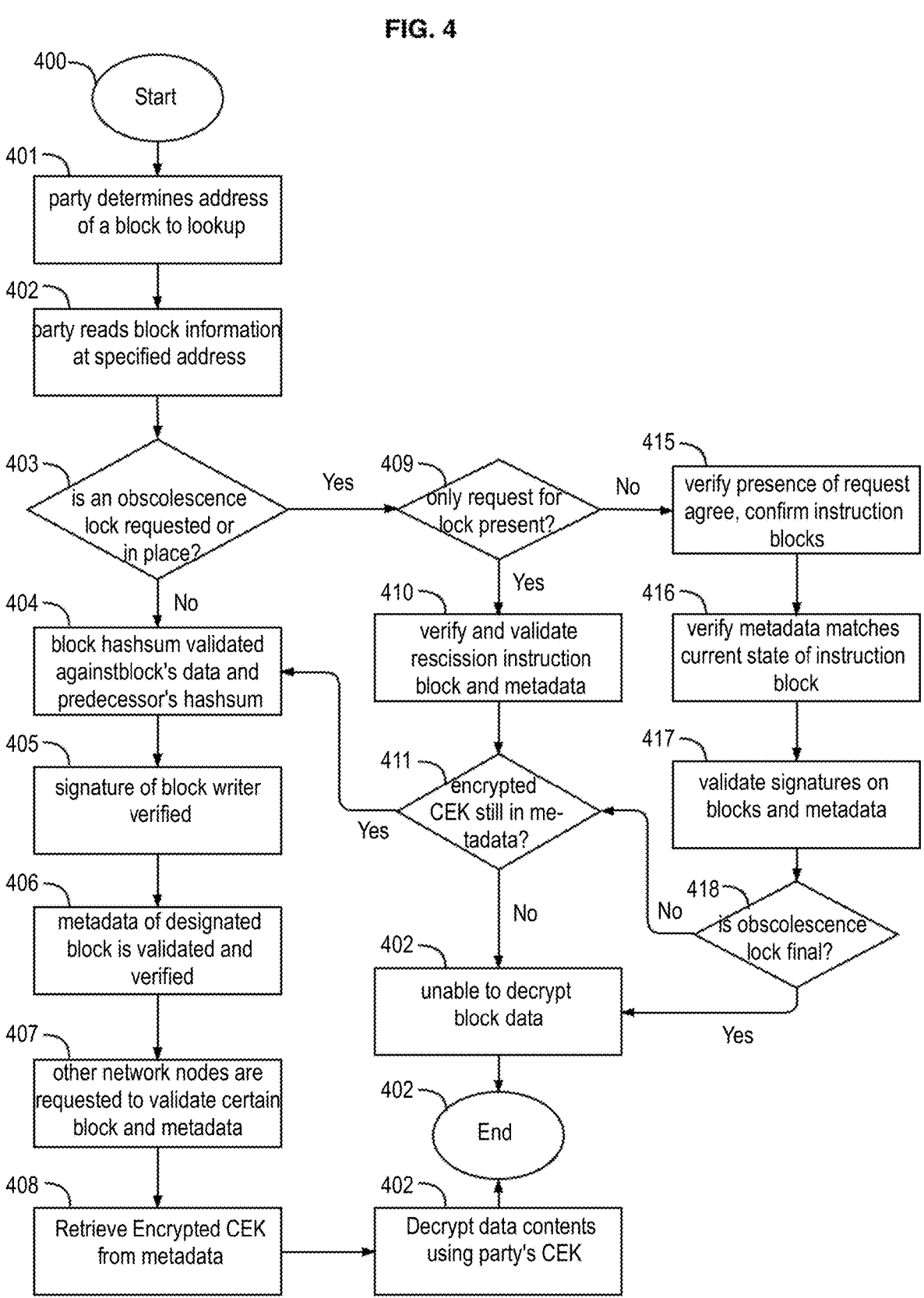
FIG. 4 illustrates an example method by which the present invention may access the data in a designated block

FIG. 4 is a flowchart which illustrates an example method by which the present invention may access the data in a designated block.

Step 400 indicates the start of the method, where a party is attempting to retrieve the data in a block. For the remainder of this example, assume this party is authorized to read the data and had an encrypted CEK stored in the metadata for the block.

In step 401, the party determines the address of the block to lookup. This address may be provided by a recurring system service such as replication, a user request to look at a document, or similar automated and manually instantiated events.

In step 402, the address may be used to find the block in the blockchain. In preferred embodiments, this lookup may be performed against a hash table which minimizes the number of nodes visited. Other exemplary embodiments may use arrays, linked lists, red black trees, or similar data computer science-based data structures to perform the lookup.

Step 403 is a conditional step which determines the next step based upon the current state of the block or blockchain, and whether a rescission request is in place or not. In the event a party has requested an obsolescence lock, there will be a rescission instruction block in the chain that, in preferred embodiments, requests a specific block be targeted for key deletion. In other exemplary embodiments, there may be multiple request blocks, or a single marked request block that specifies the chain be rescinded in part or whole. In the event a rescission instruction block does not exist, the workflow proceeds to step 404.

Step 404 begins the verification and validation of the designated data block. The hashsum of the block may be compared against the hash of the designated block's data and the predecessor block's hashsum. The same hash algorithm must be consistently applied during the creation and validation of the hash. If the provided hashsum matches the calculated hash from the designated block's data and predecessor hashsum then this designated block may be determined to be consistent and the workflow progresses to step 405.

In step 405, in preferred embodiments, the signature of the creator of the designated block may be compared with the set of permissioned authors. In other exemplary embodiments, the signature may be checked for a valid, unexpired certificate. In yet other exemplary embodiments these checks may be eschewed.

In step 406, in preferred embodiments, the metadata of the designated block may be examined and any changes to the metadata are verified. Such verification may be completed in preferred embodiments by examining the hashsums of the metadata and comparing these against the contents of the metadata. Also, the hashsum of the predecessor version of the metadata may be checked for a valid signature and changes to the metadata are verified and validated during replication. In other exemplary embodiments, the metadata may not be verified based on user, but may be validated as being in the correctly formed and in a state consistent with the presence of (or lack of) the obsolescence lock. In preferred embodiments, the hashsums of each predecessor block and associated metadata may also be validated against the contents until the genesis block is reached and validated as the terminal.

In step 407, in preferred embodiments, other parties in the blockchain network may be contacted with a request to validate the current block by comparing hashsums. In preferred embodiments, such validation may be performed with Merkle trees, but other forms of hash trees and efficient data structures may be used by other exemplary embodiments. Other exemplary embodiments may eschew the validation requests made of other blockchain participants.

In step 408, the designated block has been verified and validated and confirmed to be true and unmodified. The party's encrypted content encryption key (CEK) may be read from the designated block's metadata and decrypted to reveal the unencrypted CEK. The workflow then proceeds to step 414.

In step 414, the unencrypted CEK may be applied to the designated block's data contents and the original data is retrieved by the party. The workflow progresses to step 413.

Step 413 represents the end of the current workflow.

Returning to step 403, in the event there is a partial or complete obsolescence lock in place on the designated block or blockchain, the workflow proceeds to step 409.

Step 409 is a conditional step, the path of which is determined by the presence of only a rescission instruction block in the chain (and not an agreement instruction block or confirmation instruction block). If the rescission request is in place, the workflow proceeds to step 410.

In step 410, the rescission instruction block may be examined, and the signature of the creator of the rescission instruction block is verified as an authorized party. In preferred embodiments, the metadata of the designated block (specified for obsolescence) is also examined for the confirmation of removal of the encrypted CEK associated with the party that is the author of the designated block and said party's share of the secret obsolescence lock private key.

Step 411 is a conditional step, the path dependent upon the presence of the validating party's encrypted CEK in the metadata. Said party's encrypted CEK will still be in the metadata if said party did not request the obsolescence lock, has not already agreed to the rescission request, and in some exemplary embodiments the required number of agreements has not yet been reached to finalize the obsolescence lock. In the event the encrypted CEK is still in the metadata, then the workflow proceeds to step 404 to validate the designated block and decrypt the contents. In some embodiments, the current party has the option of agreeing to and confirming the obsolescence request in this step as well. In the event the party's encrypted CEK may no longer be in the metadata then the workflow proceeds to step 412.

In step 412, the encrypted CEK may no longer be available for this party. Either a partial or full obsolescence lock may now be in place on the designated block or, in some embodiments, the entire blockchain. Without access to the underlying CEK the party can no longer decrypt the block's data. The workflow proceeds to step 413 where it terminates.

Returning to step 409, consider the case in which more than just the rescission instruction may be in place. This means an agreement instruction block has been created and one or more confirmation blocks have been added to the blockchain. In this event the workflow proceeds to step 415.

In step 415, the party may validate the present state of the instructions related to the obsolescence lock in the blockchain. In preferred embodiments, the rescission instruction block, and any agreement instruction block and confirmation instruction blocks are examined for valid signatures by authorized parties. When the embodiment requires a specific number of agreeing parties, and that number has been reached, the existence of the confirmation block is confirmed and verified to have been signed by the reconstructed obsolescence lock private key or the private key of the confirming party.

In step 416, the metadata associated with the designated block or blockchain to be made obsolete may be verified to have all encrypted CEKs removed that are associated with the requesting and agreeing parties. When the embodiment requires a specific number of agreeing parties, and that number has been reached, the metadata may be checked for the reconstruction of the obsolescence lock private key. In other exemplary embodiments, the metadata for the block to be obsolete may be confirmed to have had all encrypted CEK entries removed for all parties after the required number of agreement blocks has been written.

In step 417, in preferred embodiments, the metadata for the block or blockchain to be made obsolete may be checked for a valid signature of the modifying parties or the reconstructed obsolescence lock private key. In other exemplary embodiments which use an obsolescence lock instruction block, or metadata on the genesis block to identify blocks or chains to be rescinded, this metadata may be similarly verified to have been signed by authorized parties or the reconstructed obsolescence lock private key.

Step 418 is a conditional step, the path of which is determined by the state of the obsolescence lock on the block or blockchain. In the event there have not been sufficient agreeing parties to reconstruct the obsolescence lock private key, the current party's encrypted CEK is still in the metadata for the block to be made obsolete. In this event, the workflow proceeds to step 411. In the event the required number of agreeing parties has been met, and the confirmation block is signed with the obsolescence lock private key, then the obsolescence lock is in force and the workflow proceeds to step 412.

FIG. 5 is an example data structure representing a block in an illustrative blockchain. The data structure described in this illustration is not inclusive of all possible fields, and those that are included have been specified either due to their importance in the basic blockchain operations, or because they are closely related to the method to rescind data access via an obsolescence lock.

Element 500 is the predecessor hashsum, storing the output of a hash function or hash algorithm of the block hashsum 501 from the predecessor block in the blockchain. In preferred embodiments, the first block in a blockchain is the "genesis block" and the predecessor hashsum may be the hash of a published blockchain from this or an external system. In other embodiments, the predecessor hashsum of the genesis block may be empty, and the data contained within is well recognized or published and represents the start of the data and an indication of a publishing date.

The predecessor hashsum is a mechanism used by blockchain to establish a history for the data contained in each predecessor blocks. If the data of a predecessor block in the chain is changed, it's hashsum will be different. As the hashsum of a block is based in part on its predecessor's hashsum, each subsequent block in the chain will have a different corresponding hashsum. Using this mechanism, the contents of each block in the chain may be validated through to the original genesis block and checked for modification.

Element 501 is the block hashsum for the current block. This hashsum is the output of a hash function or algorithm that uses the data 503 and predecessor hashsum 500 as input.

Element 502 is the metadata associated with the current block. In preferred embodiments, the metadata is not used in the calculation of the block hashsum. The metadata contains one or more fields to store data. The metadata of a published blockchain may be altered by authorized parties, subject to said party signing the metadata, then verification and validation during block replication or read requests.

Element 503 is the collected data associated with this block. In preferred embodiments, said data is typically encrypted with a Content Encryption Key (CEK) to limit access only to authorized parties prior to the application of an obsolescence lock.

Figure 6:
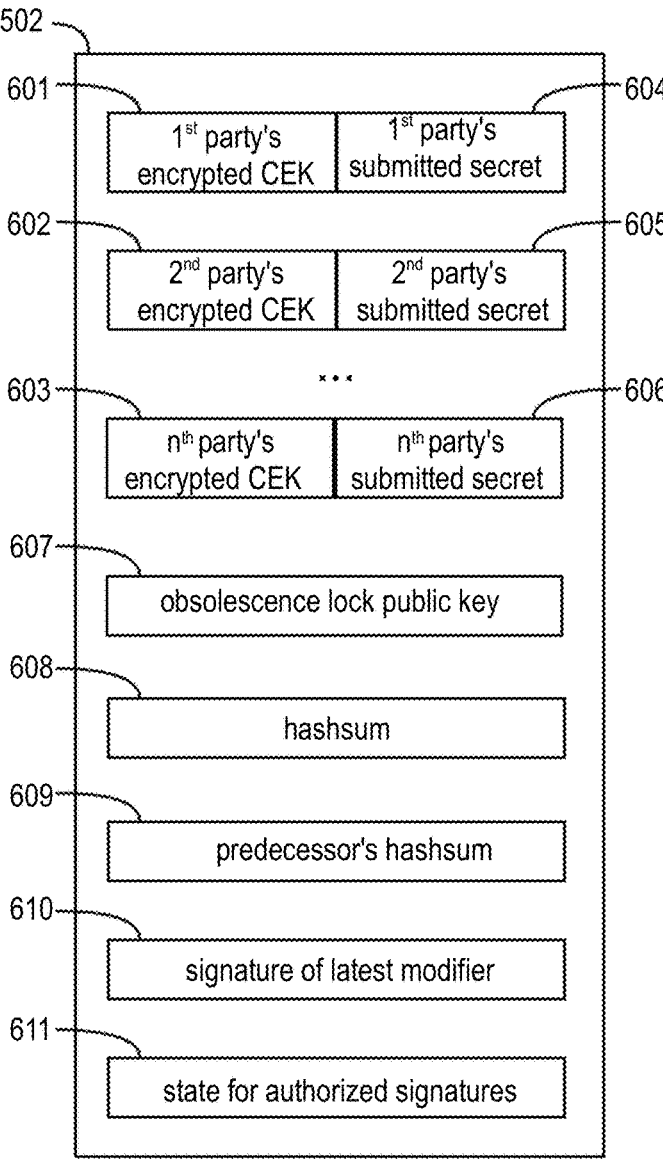
FIG. 6 is an example of a metadata data structure that supports the application of an obsolescence lock to rescind access to the associated block's data according to various embodiments described herein.

FIG. 6 is an illustrative example of a metadata data structure. The data structure described in this illustration is not inclusive of all possible fields, and those that are included have been specified either due to their importance in the basic blockchain operations, or because they are closely related to the method to rescind data access via an obsolescence lock.

Element 502 represents the entire metadata data structure as described in part in FIG. 5.

Element 601 represents the field which maintains state for the 1st party's encrypted Content Encryption Key (CEK). For example, the state may be related to the progression of applying the obsolescence lock and may allow to distinguish between CEK being available, in process of locking, and the lock applied (CEK is removed then). The encrypted CEK can only be decrypted with the private key of the 1st party. If an obsolescence lock is applied to a block or blockchain, each party's encrypted CEK is removed from the metadata, and relating to this field, the 1st party will be no longer be able to access or decrypt the CEK and thereby unable to decrypt the data contained within the block.

Element 602 represents the field which maintains state for the 2nd party's encrypted CEK. This element and field has the same characteristics as element 601 except it relates to the 2nd party exclusively.

Element 603 represents the field which maintains a state for the nth party's encrypted CEK. The nth party is the general description where there are n parties authorized to modify the metadata of a block. For example, n may be 2 in a peer to peer transaction that utilizes the blockchain in an embodiment, or a n may higher number when there are multiple participants in a transaction. This element and field has the same characteristics as element 601 except it relates to the nth party exclusively.

Element 604 represents the field which maintains state for the 1st party's submitted secret. When requesting a rescission of access to a block or blockchain, or agreeing to such a request, the 1st party may submit its secret share of the obsolescence lock's private key. Said secret share is written, for example it may be written into this field in the metadata. In preferred embodiments, the design of the secret sharing algorithm is such that having access to a number of secret shares below the required minimum number is not enough to reconstruct the secret (the obsolescence lock private key).

Element 605 represents the field which maintains state for the 2nd party's submitted secret. This element and field has the same characteristics as element 604 except it relates to the 2nd party exclusively.

Element 606 represents the field which maintains state for the nth party's submitted secret. The nth party is the general description where there are n parties authorized to modify the metadata of a block. This element and field has the same characteristics as element 604 except it relates to the nth party exclusively.

Element 607 represents the field which maintains state for the public key portion of the obsolescence lock. When the obsolescence lock is fully applied to a block or blockchain, said public key is used in conjunction with the private key that is reconstructed from the submitted secret shares. Once instantiated, the public key is henceforth made available in the metadata for validation of any element of the system that purports to have been signed by the reconstructed private key.

Element 608 represents the field which maintains state for the hashsum of the metadata. The hashsum of the metadata may be calculated using a hash function or hash algorithm that uses the other fields of the metadata as input. This hashsum, in conjunction with the signature of the modifying party contributes to the validation of the metadata, and ensuring the contents have not been changed either by a malicious party or in error.

Element 609 represents the field which maintains state for the predecessor's hashsum of the metadata. The predecessor's hashsum is the hashsum of the metadata made prior to the most recent change(s). The predecessor's hashsum is signed by the author of the most recent change(s), enabling an accountable history when validated during replication in conjunction with the state of the obsolescence lock.

Element 610 represents the field which maintains state for the signature of the last modifier of the metadata. In preferred embodiments, the metadata may be signed with the private key of the latest modifying party. This signature is used in the verification of changes and acts as proof of the identity of the modifying party.

Element 611 represents the field which maintains state for the authorized signatures. In preferred embodiments, the authorized signatures are the set of public signatures that relate to each respective party that is authorized to modify the metadata and associated block or blockchain. In other exemplary embodiments, there may be a set of authorized actions that each party may perform, for example only a limited number of parties could request rescission of access to a block's data, while all authorized parties may agree to such a request.

FIG. 7 illustrates a high-level example of an implementation of preferred embodiments, where an obsolescence lock has been applied to a block in a blockchain. In this example, there are only 2 parties involved, and a shorter 3-step confirmation process.

Element 701 is the first block in the blockchain, the "genesis block". The genesis block may itself point to another block, or as in this example, contain information from a published and dated source of data.

Element 702 is the second block in the blockchain. In this example this block contains data, access to which has been rescinded by the application of the obsolescence lock.

Element 500 is the predecessor hashsum 500, from FIG. 5 which is a reference to the previous block in the blockchain. The predecessor hashsum 500, FIG. 5 is used to validate the chain of data has not been modified.

Element 703 is the rescission instruction block. This instruction block was created by one of the authorized parties in order to begin the rescission process and apply the obsolescence lock. This request block was signed by the party which created it as proof of identity. Element 703 is connected to its immediate predecessor block in the block-chain through a predecessor hashsum 500, FIG. 5.

Element 704 is the agreement instruction block which agrees to the request to rescind. This agreement instruction block was created by the second party in this example, and signed with said party's private key. Element 704 is connected to its immediate predecessor block in the blockchain through a predecessor hashsum 500, FIG. 5.

Element 705 is the confirmation instruction block which indicates the removal of all parties' encrypted CEKs from the metadata is complete. This instruction block is signed with the reconstructed obsolescence lock private key as proof that the authorized method has been followed.

Figure 8:
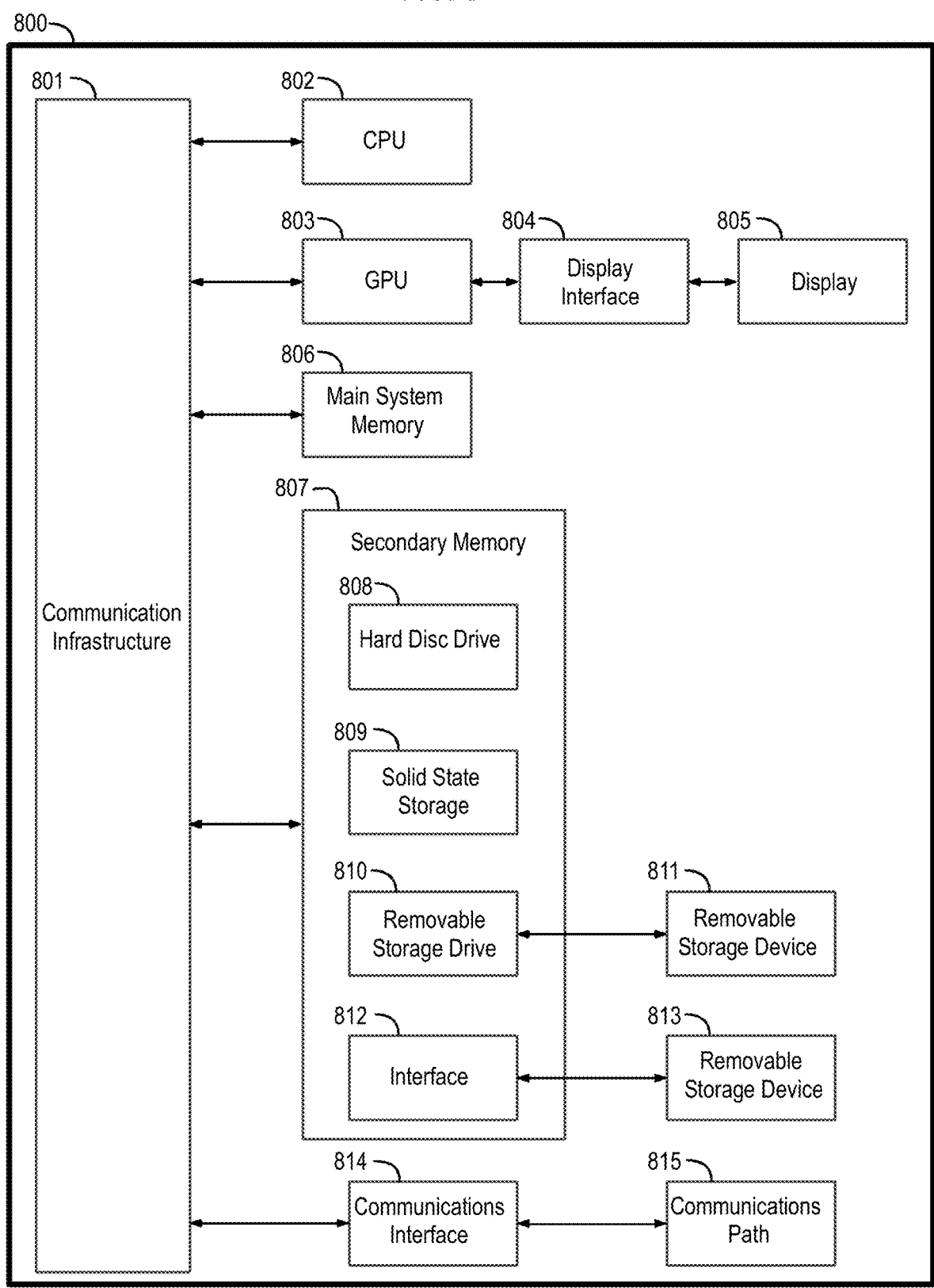
FIG. 8 illustrates an example of a high-level system architecture for a computer or similar processing and display device according to various embodiments described herein

FIG. 8 illustrates a computer system 800 in which embodiments of the present disclosure, or portions thereof, may be implemented as computer-readable code. For example, the access device 200, the web server 203, the host processing systems for data management, storage, and communication software 208, other merchant and external systems 210 of FIG. 2 may be implemented as a computer system 800 using hardware, software, firmware, non-transitory computer readable media having instructions stored thereon, or a combination thereof and may be implemented in one or more computer systems or other processing systems.

Hardware, software, or any combination thereof may embody modules and components used to implement the methods of FIG. 1 through FIG. 7 (inclusive).

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 810, a removable storage unit 811, and a hard disk installed in hard disk drive 808 or solid-state storage device 809.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

A central processing unit 802 may be a special purpose or a general-purpose processor device. The central processing unit 802 may be connected to a communication infrastructure 801, such as a bus, message queue, network (e.g., the network 207), multi-core message-passing scheme, etc. The computer system 800 may also include a main memory 806 (e.g., random access memory, read-only memory, etc.), and may also include a secondary memory 807. The secondary memory 807 may include a hard disk drive 808, a solid state memory 809 and a removable storage drive 810, such as a floppy disk drive, a magnetic tape drive, an optical disk drive, a flash memory, etc.

The removable storage drive 810 may read from and/or write to a removable storage unit 811 in a well-known manner. The removable storage unit 811 may include a removable storage media that may be read by and written to by the removable storage drive 810. For example, if the removable storage drive 810 is a floppy disk drive, the removable storage unit 811 may be a floppy disk. In one embodiment, the removable storage unit 811 may be non-transitory computer readable recording media.

In some embodiments, the secondary memory 807 may include alternative means for allowing computer programs or other instructions to be loaded into the computer system 800, for example, a removable storage unit 813 and an interface 812. Examples of such means may include a program cartridge and cartridge interface (e.g., as found in video game systems), a removable memory chip (e.g., EEPROM, PROM, etc.) and associated socket, and other removable storage units 813 and interfaces 811 as will be apparent to persons having skill in the relevant art.

Computer program medium and computer usable medium may refer to memories, such as the main memory 806 and the secondary memory 807, which may be memory semi-conductors (e.g. DRAMs, etc.). These computer program products may be means for providing software to the computer system 800. Computer programs (e.g., computer control logic) may be stored in the main memory 806 and/or the secondary memory 807. Computer programs may also be received via the communications interface 814. Such computer programs, when executed, may enable the computer system 800 to implement the present methods as discussed herein. In particular, the computer programs, when executed, may enable central processing unit 802 to implement the methods illustrated by FIG. 1 through FIG. 7 (inclusive), as discussed herein. Accordingly, such computer programs may represent controllers of the computer system 800. Where the present disclosure is implemented using software, the software may be stored in a computer program product and loaded into the computer system 800 using the removable storage drive 810, the interface 812, and the hard disk drive 808, the solid state storage 809, or the communications interface 814.

The computer system 800 may also include a communications interface 814. The communications interface 814 may be configured to allow software and data to be transferred between the computer system 800 and external devices. Exemplary communications interfaces 814 may include a modem, a network interface (e.g., an Ethernet card), a communications port, a PCMCIA slot and card, etc. Software and data transferred via the communications interface 814 may be in the form of signals, which may be electronic, electromagnetic, optical, or other signals as will be apparent to persons having skill in the relevant art. The signals may travel via a communications path 815, which may be configured to carry the signals and may be implemented using wire, cable, fiber optics, a phone line, a cellular phone link, a radio frequency link, etc.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

REFERENCES (DOCUMENTS INCORPORATED HEREIN BY REFERENCE)

US 20080040602 entitled Systems and methods for public-key encryption for transmission of medical information by Williams et al, filed May 10, 2007.
US 20070005978 entitled "Digital signatures for network forms" by O'Connor et al. filed Jun. 29, 2005.

The invention claimed is:

1. A method of rescinding access to a designated block within a blockchain, wherein the blockchain comprises a plurality of blocks, wherein the designated block contains data encrypted with a content encryption key and is associated with metadata, wherein the metadata for the designated block include an obsolescence lock pubic key, the method comprising the steps of:
   a. creating, at the time the designated block is created, an obsolescence lock for supporting a rescission request if the rescission request is agreed upon by a required number of authorized parties for the designated block, wherein the obsolescence lock comprises an obsolescence lock private key and an obsolescence lock public key;
   b. splitting the obsolescence lock private key into a number of secret shares;
   c. transmitting, to each authorized party for the designated block, an individual secret share of the number of secret shares;
   d. receiving, from one of the authorized parties, a rescission instruction block that contains the rescission request related to the designated block;
   e. receiving, from another one of the authorized parties, of an agreement instruction block that contains an agreement decision related to the rescission request;
   f. removing, upon request from the authorized party that inclusively has comprised the required number of authorized parties that agree upon the rescission request, of all encrypted content encryption keys from the metadata of the designated block, thereby rescinding access to original data within the designated block; and
   g. receiving, from the authorized party that inclusively has comprised the required number of authorized parties, of a confirmation instruction block that contains a confirmation of the execution of the rescission, wherein the confirmation instruction block is signed by that agreeing party with the obsolescence lock private key reconstructed by that party.

2. The method of claim 1, further comprising: signing the rescission instruction block with a private key of a requesting party.

3. The method of claim 1, further comprising: adding the obsolescence lock public key to the metadata associated with the designated block.

4. The method of claim 1, further comprising: signing the agreement instruction block with a private key of the authorized party.

5. The method of claim 1, further comprising: submitting the individual secret share of the authorized party from which the obsolescence lock private key may be reconstructed.

6. The method of claim 1, further comprising: signing the confirmation instruction block with the private key of the agreeing party.

7. The method of claim 1, wherein the metadata for the designated block does not form part of data that is used for calculation of a hashsum of the designated block.

8. A method of rescinding access to a designated blockchain, wherein the designated blockchain contains data encrypted with a content encryption key and is associated with metadata, wherein the metadata for the designated blockchain include an obsolescence lock public key, the method comprising the steps of:
   a. creating, at the time the designated blockchain is created, an obsolescence lock for supporting a rescission request if the rescission request is agreed upon by a required number of authorized parties for the designated blockchain, wherein the obsolescence lock comprises an obsolescence lock private key and an obsolescence lock public key;
   b. splitting the obsolescence lock private key into a number of secret shares;
   c. transmitting, to each authorized party for the designated blockchain, an individual secret share of the number of secret shares;
   d. receiving, from one of the authorized parties, a rescission instruction block that contains the rescission request related to the designated blockchain;
   e. receiving, from another one of the authorized parties, an agreement instruction block that contains an agreement decision related to the rescission request;
   f. removing, upon request from the authorized party that inclusively has comprised the required number of authorized parties that agree upon the rescission request, of all encrypted content encryption keys from the metadata of the designated blockchain, thereby rescinding access to the original data within the designated blockchain; and
   g. receiving, from the authorized party that inclusively has comprised the required number of authorized parties, of a confirmation instruction block that contains a confirmation of the execution of the rescission, wherein the confirmation instruction block is signed by that agreeing party with the obsolescence lock private key reconstructed by that party.

9. A computer system comprising:
   at least one nontransitory processor-readable storage medium that stores at least one of processor-executable instructions or data; and
   at least one processor communicably coupled to the at least one nontransitory processor-readable storage medium, wherein the at least one processor is configured to perform the steps of the method claim 1.

10. A non-transitory computer readable storage medium storing instructions which, when executed on a computer, cause the computer to perform the steps of the method of claim 1.

11. A computer system comprising:
   at least one nontransitory processor-readable storage medium that stores at least one of processor-executable instructions or data; and at least one processor communicably coupled to the at least one nontransitory processor-readable storage medium, wherein the at least one processor is configured to perform the steps of the method claim 8.

12. A non-transitory computer readable storage medium storing a computer program product comprising instructions which, when executed on a computer, cause the computer to perform the steps of the method of claim 8.

\* \* \* \* \*